United States Patent
Jordan et al.

(10) Patent No.: US 6,747,988 B1
(45) Date of Patent: Jun. 8, 2004

(54) SWITCHING SYSTEM FOR TELECOMMUNICATIONS NETWORK

(75) Inventors: Reuven Jordan, Ramat Hasharon (IL); Avraham Silbiger, Mevasseret Zion (IL); Joseph Moshe, Herzeliya (IL); Yechiel A. Rosengarten, Raanana (IL); Israel Vitelson, Givataim (IL)

(73) Assignee: ECI Telecom Ltd., Petach-Tikva (IL)

( * ) Notice: Subject to any disclaimer, the term of this patent is extended or adjusted under 35 U.S.C. 154(b) by 0 days.

(21) Appl. No.: 09/258,861

(22) Filed: Feb. 26, 1999

(51) Int. Cl.$^7$ .............................................. H04L 12/56
(52) U.S. Cl. ....................................... 370/466; 370/360
(58) Field of Search ................................. 370/465, 466, 370/376, 360, 535, 358

(56) References Cited

U.S. PATENT DOCUMENTS

| | | | |
|---|---|---|---|
| 5,193,087 A | | 3/1993 | Lichtash et al. ........... 370/58.2 |
| 5,331,632 A | * | 7/1994 | Aaron et al. |
| 5,365,518 A | | 11/1994 | Noser ......................... 370/58.1 |
| 5,526,397 A | * | 6/1996 | Lohman ....................... 379/58 |
| 5,757,793 A | | 5/1998 | Read et al. |
| 5,809,021 A | | 9/1998 | Diaz et al. |
| 6,122,288 A | * | 9/2000 | Dashiff et al. .............. 370/465 |
| 6,128,321 A | * | 10/2000 | Bennett et al. ............. 370/535 |
| 6,278,697 B1 | * | 8/2001 | Brody et al. ................ 370/310 |

* cited by examiner

Primary Examiner—Kenneth Vanderpuye
(74) Attorney, Agent, or Firm—Browdy and Neimark, P.L.L.C.

(57) ABSTRACT

A switching system for a telecommunications network, including a switching matrix, a transport interface for receiving signals from a plurality of I/O ports, the signals being arranged in channels of at least a first and a second format, a plurality of cross-connections for switching the signals between the I/O ports via the switching matrix; and a server operatively associated with the switching matrix and including format exchanging circuitry operable to receive a signal arranged in the first format and to rearrange the signal into the second format, thus producing a converted signal, and to transmit the converted signal to the switching matrix for eventual output.

15 Claims, 3 Drawing Sheets

SWITCHING SYSTEM FOR TELECOMMUNICATIONS NETWORK

FIELD OF THE INVENTION

The present invention relates to switching systems for telecommunications networks.

BACKGROUND OF THE INVENTION

The Public Switched Telephone Network (PSTN) worldwide operates under a number of different standards. These standards indicate, among other things, methodology both for companding digital signals and for multiplexing these digital signals into carriers. Most of the world has digitized traffic that travels between Central Offices. There are two widely used standards for companding digital signals, known as A-law and μ-law standards. There are also two basic standards for multiplexing of voice signals, generally known as DS-1 and CEPT-1 for the lowest level multiplexed carriers. Generally μ-law and DS-1 are used in North America and A-law and CEPT-1 are used in Europe. The North American and European systems respectively may also be termed the North American hierarchy (Asynchronous Hierarchy) and the ITU Digital Hierarchy (Plesiochronous Digital Hierarchy).

Individual voice channels are digitized using either A-law or μ-law, into what is called DS-0 digital streams. These streams are then multiplexed into carriers using time division multiplexing (TDM) techniques. For North America, the DS-1 carrier is the lowest level multiplexed carrier, having up to 24 DS-0 channels per carrier, while in Europe the CEPT-1 carrier is the lowest level multiplexed carrier, having up to 30 DS-0 channels per carrier with two additional channels reserved for framing and optionally signaling or as an additional DS-0 channel.

Each of the above-mentioned multiplexed characters has their own control and synchronization functions, carried either in excess bits which are added into the stream or, as previously described, in a control channel set aside for this purpose. High order multiplexing exists, with a number of DS-1/CEPT-1 streams being multiplexed into ever higher carriers such as DS-3 for North America and CEPT-3 for Europe. In Japan, a different hierarchy is used. Fiber Optic Transmission systems use DS-3 or CEPT-3 as the basis for transmission, with added overhead for control and synchronization, and here too higher order multiplexing exists. In North America the standard for Fiber Optic Transmission is known as North American Synchronous Optical Network (SONET), whereas in Europe the Synchronous Digital Hierarchy (SDH) standard is used.

There often exists a need to cross connect between the two transmission standards, such as when a phone call is made from Europe to North America—a transatlantic call. In order to accomplish this, the signal is stripped down to the individual DS-0 level, converted from one companding method to the other, and remultiplexed using the appropriate techniques for the destination.

Digital Cross Connects are also well known in the art. In the United States, they are covered by a number of standards, including Bellcore TR-NWT-000233, which is incorporated herein in its entirety by reference. Digital Cross Connects are generally used to cross connect over a relatively long period of time a large number of multiplexed transmission streams, such as DS-1 or CEPT-1 streams. Some of the individual DS-0 channels which are part of the stream may be cross connected to other destinations, in which case the cross connect which is capable of this function is known as a 1/0 cross connect. In the event that higher order streams may be cross connected this would also be designated in the description of the cross connect, so that a cross connect that can individually connect DS-3, DS-2, DS-1, and their individual DS-0 signals would be described as a 3/2/1/0 cross connect. Bellcore Standard TR-NWT-000233, referenced above, describes the Generic Criteria of these cross connects.

In a standard layout of a prior art generic digital cross connect, as shown in FIG. 1, the signal first goes to a Transport Interface 10, and then it proceeds through the Cross Connect Matrix 12 to another Transport Interface 10 on the destination side. The transport interfaces at each side perform both physical layer functions and logical layer functions. Thus, any physical or logical transformations are carried out in the Transport Interface, prior to entering the Cross Connect matrix, or after leaving it. In the case of the typical transatlantic call mentioned above, the conversion method above would thus have to be done in the transport interface. It is to be noted that each input and output signal must be connected to a transport interface, and therefore the conversion function must be duplicated in each and every transport interface that is to perform the function. While other functions such as framing, logical error monitoring and facility data link in the DS-1 extended super frame (ESF) format may be handled in the transport interface, it would be more economical to not have to duplicate the conversion function, or other functions, in each and every transport interface.

A Digital Cross Connect for SONET is described in U.S. Pat. No. 5,365,518, and comprises an interface layer, a cross connect matrix, and an overhead server. The overhead server combines a multiplexer/demultiplexer and time slot interchanging circuitry with server controls and a switch module to handle both high-speed overhead and data through the matrix. Thus the server is capable of accomplishing cross connection of individual DS-0 streams. The system uses a SONET like signal throughout the matrix, and as a result the system can not be used to translate from North American to European standards in the server, since the matrix operates only under one standard. All conversions and other transport functions must be done in the transport interface prior to entering the matrix.

An electronic digital cross-connect system is known from U.S. Pat. No. 5,193,087. In this system the digital cross-connect is a space matrix, in which any input can be cross connected to any output with no significant time delay. The matrix uses a coded electronic signal to enable it to recreate at the output all aspects of the incoming signal, including any bipolar variations. However, again any conversion would have to he done in the transport interface. A Pulse Width Modulation (PWM) encoding technique is also described in U.S. Pat. No. 5,193,087.

A digital interface between different formats of digital signal is described in: Digital Interface Between the SLC96 Digital Loop Carrier System and a Local Digital Switch, TR-TSY-000008, Issue 2, August 1987.

T1 and E1 access signals cross-connect are governed by the following standards, respectively: Bellcore TR-170 and ITU-T G.796.

Thus there is a long felt need for a method of accomplishing functions of the transport interface in a more economical fashion.

The disclosures of all references mentioned above and throughout the present specification are hereby incorporated herein by reference.

SUMMARY OF THE INVENTION

There is thus provided in accordance with a preferred embodiment of the present invention a switching system for a telecommunications network, including a switching matrix, a transport interface for receiving signals from a plurality of I/O ports, the signals being arranged in channels of at least a first and a second format, a plurality of cross-connections for switching the signals between the I/O ports via the switching matrix, and a server operatively associated with the switching matrix and including format exchanging circuitry operable to receive a signal arranged in the first format and to rearrange the signal into the second format, thus producing a converted signal, and to transmit the converted signal to the switching matrix for eventual output.

Further in accordance with a preferred embodiment of the present invention the first format and the second format each include one of the following: at least part of the North American hierarchy (Asynchronous Hierarchy), at least part of the ITU Digital Hierarchy (Plesiochronous Digital Hierarchy), and at least part of the Japanese hierarchy, wherein the first format and the second format are not identical.

Still further in accordance with a preferred embodiment of the present invention the first format and the second format each have a tributary, and each tributary includes one of the following: an E-1 tributary, and a T-1 tributary. Additionally in accordance with a preferred embodiment of the present invention the cross-connections are operable to demultiplex channels in the first format and remultiplex channels in the second format.

Moreover in accordance with a preferred embodiment of the present invention the cross-connections are operable to perform, on the demultiplexed channels, at least one of the following: A-law to µ-law conversions, and µ-law to A-law conversions.

Further in accordance with a preferred embodiment of the present invention the plurality of cross-connections is included in the switching matrix, the switching matrix being operable to carry signals of the first format and the second format.

Still further in accordance with a preferred embodiment of the present invention the cross-connections further include a converting matrix operable to demultiplex channels, carry out at least one of A-law to µ-law conversions and µ-law to A-law conversions on the demultiplexed channels, and to remultiplex the channels.

Additionally in accordance with a preferred embodiment of the present invention the converting matrix is operable to carry out remultiplexing independently of demultiplexing.

Moreover in accordance with a preferred embodiment of the present invention channels received at the interface in one of the first format and the second format are passed to the switching matrix in the same one of the first format and the second format.

There is also provided in accordance with another preferred embodiment of the present invention a switching system for a telecommunications network, including a switching matrix, a transport interface for receiving signals from a plurality of I/O ports, the signals being arranged in multiplexed channels, a plurality of cross-connections for switching the signals between the I/O ports via the switching matrix, and a server operatively associated with the switching matrix and including circuitry operable to receive a signal arranged in the multiplexed format and to perform logical layer functions on the multiplexed channel, and to transmit the converted signal to the switching matrix for eventual output.

Further in accordance with a preferred embodiment of the present invention the logical layer function includes at least facility data link in the DS1 Extended Superframe Format.

There is also provided in accordance with another preferred embodiment of the present invention a method of converting signals arranged in multiplex channels of a first format to signals arranged in multiplex channels of a second format and routing the signals, including the steps of receiving the signals from a plurality of I/O ports, routing the signals over a matrix to a central converter, demultiplexing the channels of a first format into individual voice channels, converting the individual voice channels into channels of the second format, remultiplexing the channels of the second format, and routing the remultiplexed channels over a matrix to appropriate output ports.

Still further in accordance with a preferred embodiment of the present invention the first format and the second format each include one of the following: at least part of the North American hierarchy (Asynchronous Hierarchy), at least part of the ITU Digital Hierarchy (Plesiochronous Digital Hierarchy), and at least part of the Japanese hierarchy, wherein the first format and the second format are not identical.

Additionally in accordance with a preferred embodiment of the present invention the first format is E1 and the second format is T1.

Moreover in accordance with a preferred embodiment of the present invention the first format is T1 and the second format is E1.

Further in accordance with a preferred embodiment of the present invention the step of demultiplexing the channels of a first format into individual voice channels is followed by a step of A-law to µ-law conversion.

Still further in accordance with a preferred embodiment of the present invention the step of demultiplexing the channels of a first format into individual voice channels is followed by a step of µ-law to A-law conversion.

There is also provided in accordance with another preferred embodiment of the present invention a method of performing logical layer functions in switching system for a telecommunications network, including receiving signals from a plurality of I/O ports, the signals being arranged in multiplexed channels, providing a plurality of cross-connections for switching the signals between the I/O ports via the switching matrix, and providing a server operatively associated with the switching matrix to receive a signal arranged in the multiplexed format and to perform logical layer functions on the multiplexed channel, and to transmit the converted signal to the switching matrix for eventual output.

Further in accordance with a preferred embodiment of the present invention the logical layer function includes at least facility data link in the DS1 Extended Superframe Format.

BRIEF DESCRIPTION OF THE DRAWINGS

For a better understanding of the invention and to show how the same may be carried into effect, reference will now be made, purely by way of example, to the accompanying drawings in which.

DESCRIPTION OF THE PREFERRED EMBODIMENTS

Figure 1:
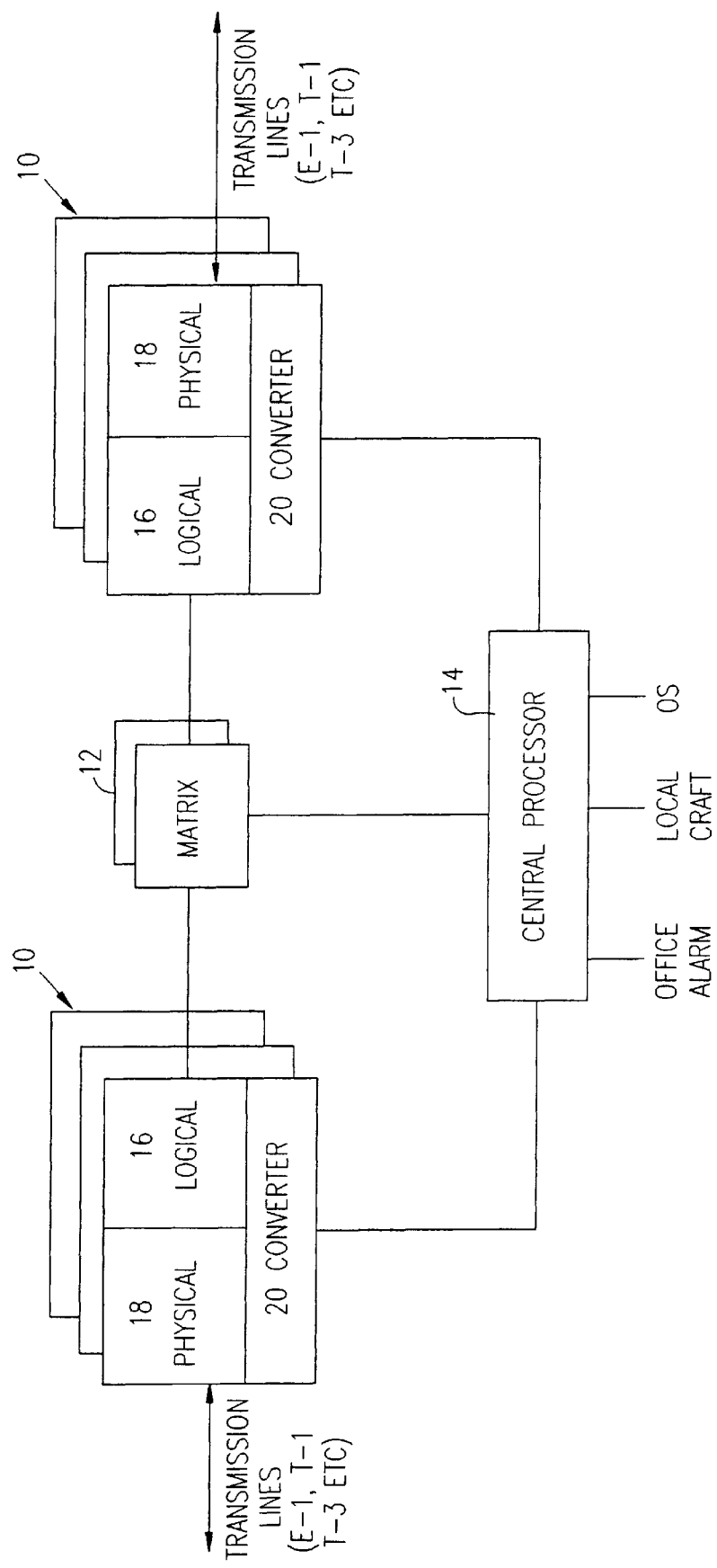
FIG. 1 shows a prior art switching system including functionality for converting between standards.

Reference is now made to FIG. 1, which shows a prior art switching system that allows for conversion between signals formatted according to different standards, and more specifically, one that allows for conversion between signals formatted according to European and North American standards. Without being limiting in any way, the invention and prior art will be described using the lowest order multiplexing for each standard, it being understood that the same techniques apply to higher order multiplexed signals.

In the switching system of FIG. 1 there is shown a transport interface 10, and a switching matrix 12. Operation is controlled by a central processor 14, known also as a common unit. The interface layer 10 is adapted to receive incoming signals arranged as either DS-1 or CEPT-1 signals which are carried on a T1 or E1 transmission line respectively, or as higher order multiplexed signals complying with European, North American or Japanese standards. As explained above, each multiplexed DS-1 or CEPT-1 channel may contain up to 24 individual voice channels in the North American standard or up to 31 individual voice channels in the European standard. Incoming channels may have been companded using either A-law or μ-law standards.

The interface layer comprises a logical layer 16 and a physical layer 18. The logical layer 16 carries out functions including framing, logical error monitoring, multiplexing, demultiplexing; and various overhead functions. The physical layer 18 carries out functions including line coding, physical error monitoring, and loss of signal monitoring.

In addition to the above, the logical layer 16 of FIG. 1 comprises a converter 20. The converter 20 provides the interface level 10 with additional functionality to convert between signal formats. Converting between signal formats is done at the DS-0 level. Thus, after demultiplexing the signal, conversion as required would be accomplished. The converted signal would then be converted into the cross-connect matrix transport format and sent into the matrix. Alternatively, the conversion can be done at the exit side transport interface. In either case, the final signal format must match that which is connected to the physical layer prior to being sent for transmission to the transmission line. For example, if the transport interface 10 is connected to an E-1 line, transport interface 10 must ensure that signals at the exit of physical layer 18 match the CEPT standard.

The central processor 14 issues control signals to ensure that the conversion to the appropriate format is carried out at a logical layer (either before or after the matrix) prior to being received at the physical layer of the interface. All logical layer functions that are required, including grooming, framing, and error monitoring are duplicated in all transport interfaces that are connected to similar transmission lines. Thus, if 100 T-1 and 100 E-1 lines are connected to a cross connect of the type shown in FIG. 1, and each line requires conversion, at least 100 converters of type 20 will be required.

The switching matrix 12 receives signals from the interface layer and routes them towards their intended destinations. The matrix is generally designed to handle a specific matrix transport format signal, and therefore conversion will be done on all signals first to the matrix transport format. In the event that this signal allows coding of the original framing format, such as DS-1 and CEPT-1, the conversion of the framing formats may be done in either of the two Transport Interfaces (incoming or outgoing) and then carried through the cross-connect matrix.

The transport layer comprises a plurality of ports (not shown). A disadvantage with the prior art is that each port (not shown) of the interface must contain additional hardware in order to be able to carry out conversion. This adds to cost and makes a digital cross connect employing such equipment difficult to upgrade, as each individual transport interface must be upgraded.

Figure 2:
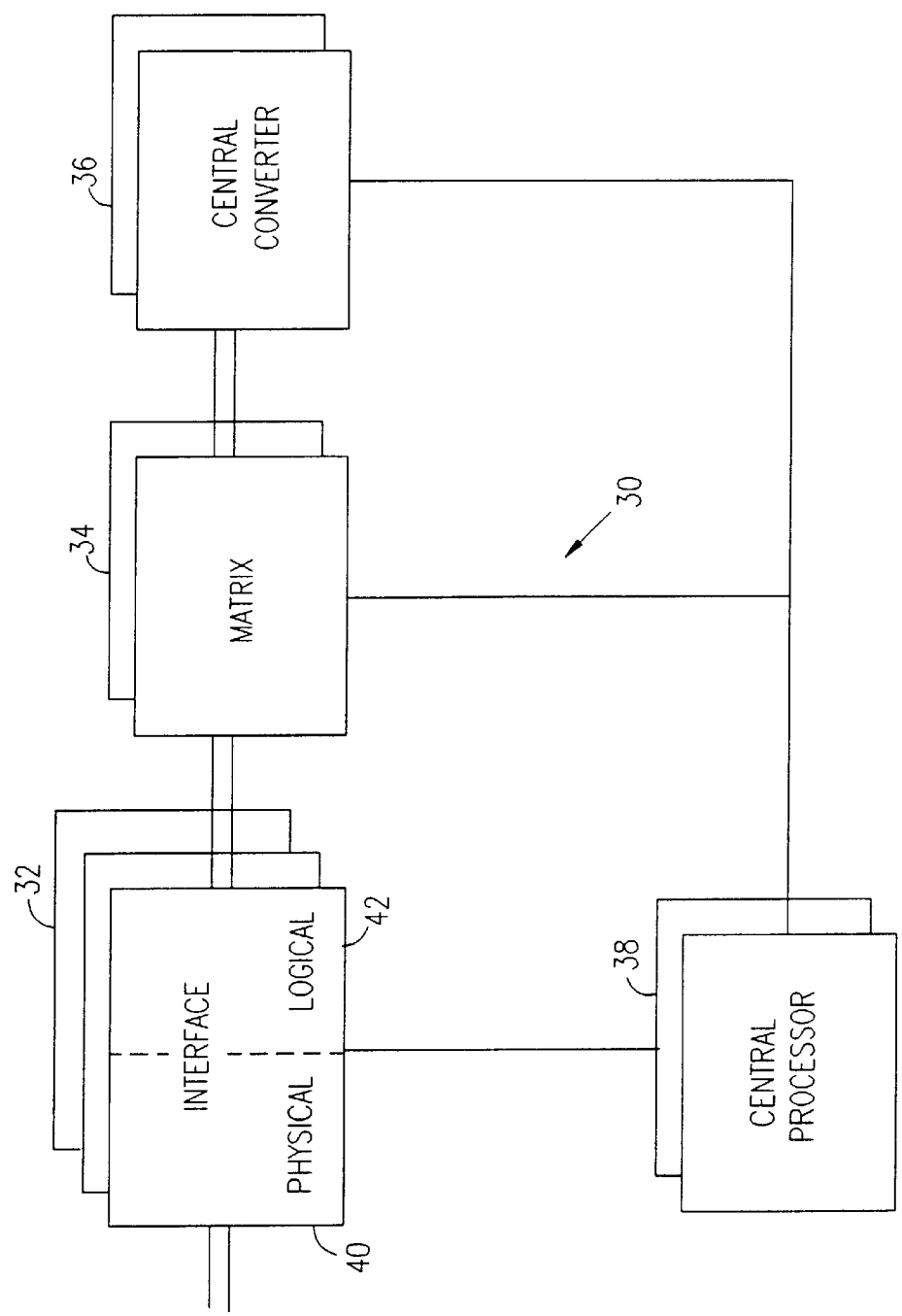
FIG. 2 is a simplified block diagram of a switching system according to an embodiment of the present invention.

Reference is now made to FIG. 2, which is a simplified block diagram of a switching system 30 according to a first embodiment of the present invention. In FIG. 2 the switching system 30 comprises a transport interface 32, a switching matrix 34 and a central converter 36. Operation of the switching system is controlled by a central processor 38.

The interface layer 32 preferably comprises a physical logical layer 40 and a physical layer 42 as before, but does not comprise a converter. Instead, signals are converted to the matrix transport format and are sent to the switching matrix 34 preserving the framing and, preferably, line code in the format in which they are received. This may be accomplished using a number of methods, including a Pulse Width Modulation (PWM) encoding technique described in U.S. Pat. No. 5,193,087, the disclosure of which is hereby incorporated herein by reference. The switching matrix 34 is thus adapted to transfer signals of all formats, as will be explained in greater detail below. If conversion is required, the switching matrix 34 preferably routes incoming signals to the central converter 36 which is operable to convert between signals formatted according to different standards, as will be discussed in detail below. The converted signal is then sent back into the switching matrix 34, and is then routed to another transport interface 32 which is connected to the destination.

Figure 3:
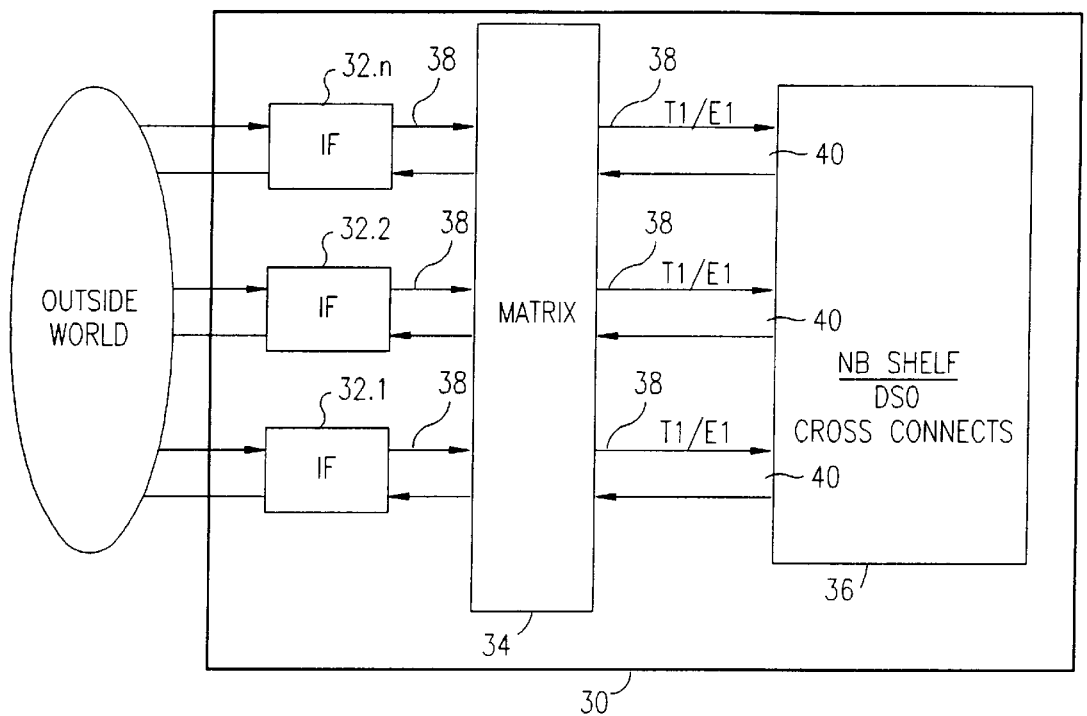
FIG. 3 is a simplified block diagram of the switching system of the embodiment of FIG. 2 showing in greater detail three of the elements of FIG. 2.

Reference is now made to FIG. 3, which is a simplified block diagram of the switching system 30 of the embodiment of FIG. 2 showing, in greater detail, the interface layer 32, and the connections between the transport interface 32, the switching matrix 34 and the central converter 36. A plurality of interface units 32.1 ... 32.n, each comprising a plurality of ports (not shown), receive incoming signals, preferably in the form of T1 and E1 or higher data streams, and may carry out the physical layer functions and some logical layer functions on these signals.

The signals are converted to a matrix transport format, while maintaining the original framing and coding formats. Switching matrix 34, preferably a space matrix, comprises cross-connections for two-way connection of these data streams between the transport interface 32 and the central converter 36.

The central converter 36 is a central converter with DS-0/E0 cross-connect capability, also termed herein a "narrow band cross-connect server", having I/O ports 40 for connection to the two-way encoded T1-E1 channels 38. The terms "T1" and "E1" are used in this context to indicate that the coding and framing of the original signals are preserved in the matrix transport format, and have preferably not been converted but only encoded. The central converter 36 is operable to demultiplex incoming E1 and T1 channels into individual voice channels, hereafter referred to as DS-0 channels. The converter comprises DS-0 cross-connects (not shown) which preferably allow DS-0 channels to be cross-connected individually between the I/O ports. The DS-0 channels can be directed, via the cross-connects, to appropriate I/O ports 40 where they can be remultiplexed for return to the switching matrix 34.

In the above arrangement, it is noted that remultiplexing at the output is independent of the demultiplexing at the input. Thus partially populated multiplex channels can be eliminated because the output multiplex channels are formed of whatever DS-0 channels happen to be available, irrespective of their source.

Figure 4:
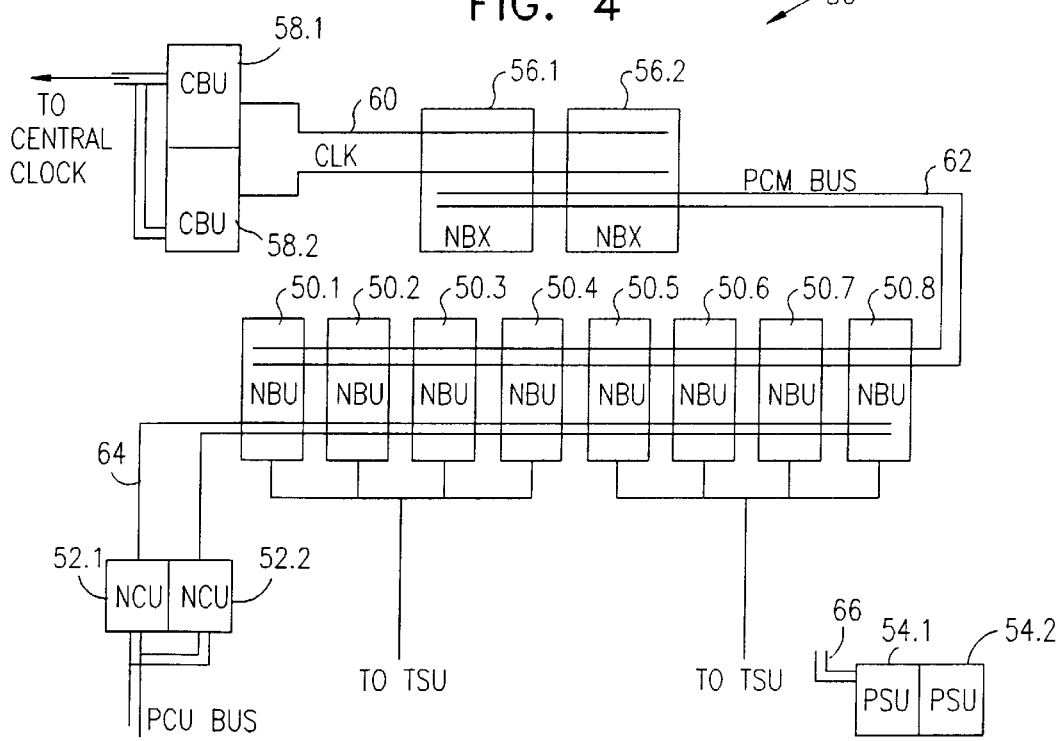
FIG. 4 is a simplified block diagram of the central converter of FIG. 2 showing switching, control and conversion circuitry.

Reference will now be made to FIG. 4, which is a simplified block diagram of one embodiment of the central converter 36 of FIG. 2. The central converter 36 of this embodiment preferably comprises up to eight narrow band units 50.1 . . . 50.8. (NBU) each of which is operable to process multiplexed channels. The NBUs are each one of four types, a TNBU, an ENBU, an ANBU and a UNBU. A TNBU supports T1 channels. An ENBU supports E1 channels. An ANBU is an ENBU, that is to say it supports E1 channels, but it has an additional function of supporting A-law to $\mu$-law conversion. A UNBU is a TNBU, that is to say it supports T1 channels, and it has the additional function of supporting $\mu$-law to A-law conversion.

DS-0 channels from an E1 channel can be remultiplexed directly to a T1 channel and conversely DS-0 channels from a T1 channel can be remultiplexed directly to an E1 channel. Thus the TNBUs and the ENBUs do not carry out A-law to $\mu$-law conversions, but do convert between E-1 and T-1 formats. This feature allows for data communication to be transported from one format to another, since in data transport no A-law to $\mu$-law conversion should be done, as such encoding is only for voice transmission.

The NBUs 50.1–50.8 may include at least two, and in some cases all four, of the above-mentioned NBU types. The exact numbers of each type will be selected by the skilled person in accordance with the circumstances of each switching system.

Optionally, in a preferred embodiment only seven of the NBUs 50.1 . . . 50.8 are used, and the eighth serves as a backup. The backup NBU should preferably be an ANBU or a UNBU so that it can provide back-up protection for the maximum possible number of functions.

The central converter 36 comprises two narrow band control units 52.1, and 52.2 to control operation. The second unit 52.2 is preferably a backup unit. Two Power supply units 54.1 and 54.2 preferably power the unit in a 1+1 protection by a load sharing scheme.

The DS-0 channel cross-connects, referred to above in connection with FIG. 3, are provided by two narrow band cross-connect units NBX 56.1 and 56.2. Again, the second unit 56.2 is provided for backup purposes. The individual cross-connects may include 2-way DS-0 cross-connects, and 2-way bundle cross-connects, which are cross-connects between two groups of contiguous DS-0 time slots, and which are particularly useful for providing an n×64 k cross-connect, where n=2–24 for T1 and 2–31 for E1, in accordance with the different number of DS-0 channels in T1 and E1. Other cross-connects that may be used are framing cross-connects, which allow the first bit of a T1 frame or the first time slot of an E1 frame to pass intact through the NBX 56, allowing, for example, a full T1 including, but not limited to, its framing, data-link, CRC4, and T1.403 to pass through internationally over an E1. Gateway cross-connects may also be provided, allowing a 2-way cross connection between T1 and E1 DS-0 time slots. A DS-0 cross-connect may include a signaling cross-connect, depending on the DS-0 definition used in a given system and typically individually settable for each cross-connect.

It is appreciated that cross-connect of signals is generally covered by standards; T1 and E1 access signals cross-connect, for example, are governed by the following standards, respectively: Bellcore TR-170 and ITU-T G.796. It is further appreciated that components of the present invention preferably comply with applicable standards.

T1 framing bit transparency allows an embedded data link to be passed through intact. Thus, the SLC96 T1 interface, described in Digital Interface Between the SLC96 Digital Loop Carrier System and a Local Digital Switch, TR-TSY-000008, Issue 2, August 1987, the disclosure of which is hereby incorporated by reference, is preferably supported. T1 framing bit transparency also allows transmission of a T1 signal within an E1 signal. This allows for central handling of the facility data link in the DS-1 Extended Superframe Format (ESF) to be handled in the central converter 36 and not in individual transport interface logical layers.

The entire range of international gateway cross-connect features can be handled in the central converter 36, including optional zero code suppression for each DS-0 cross connect separately, providing framing bit transparency in which the framing bits and channels are passed from incoming signal to outgoing signal without being recreated. Standard alarms are also handled, typically including Alarm Indication Signal (AIS), Loss of Frame (LOF), and Remote Alarm Indication (RAI).

The central converter 36 is clocked from a central clock (not shown) via two clock buffer units (CBU) 58.1 and 58.2. The second unit 58.2 again preferably serves as a backup. The system buses, including the clock bus 60, the PCM bus 62, the control bus 64 and the power supply bus 66, are all preferably dual redundant.

In the operation of the central converter 36, incoming E1 and T1 channels are received at the NBUs. The channels are then synchronized to a clock signal from the CBU 58, thus allowing for the DS-0 channels to synchronously propagate across the cross-connects of the NBX 56. The T1 and E1 signals are terminated at the NBUs 50.1 . . . 50.8 and demultiplexed into individual DS-0 channels. In the ANBU and UNBU units the additional step of conversion between A-law and $\mu$-law is carried out at this stage, that is to say after demultiplexing and before sending via the cross-connects. The NBX 56 acts as a server to the NBUs 50 and handles signaling cross-connections as well as allowing time slot exchange of the DS-0 channels.

The DS-0 channels are sent via the cross-connects of the NBX 56 to the appropriate NBU for output, where they are remultiplexed into T1 and E1 channels as appropriate and then sent back to the switching matrix 34.

There is thus provided a switching system in which signals can be centrally converted between T1 and E1 format and between $\mu$-law and A-law. Optionally, the switching system may provide for central handling of the facility data link in the DS-1 Extended SuperFrame Format (ESF) also known as T1.403. Other logical layer functions may also be handled in the central converter.

It is appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable subcombination.

It will be appreciated by persons skilled in the art that the present invention is not limited to what has been particularly shown and described hereinabove. Rather, the scope of the present invention is defined only by the claims that follow:

What is claimed is:

1. A switching system for a telecommunications network, comprising:
   a switching matrix;
   a transport interface for receiving signals from a plurality of I/O ports, the signals being arranged in channels of at least a first and a second format;
   a plurality of cross-connections for switching the signals between the I/O ports via the switching matrix; and
   a server operatively associated with said switching matrix and comprising format exchanging circuitry operable to receive a signal arranged in said first format and to rearrange said signal into said second format, thus producing a converted signal, and to transmit said converted signal to said switching matrix for eventual output,
   wherein said first format and said second format each comprise one of the following:
   a first standard format provided by the North American Hierarchy (Asynchronous Hierarchy);
   a second standard format provided by the ITU Digital Hierarchy (Plesiochronous Digital Hierarchy); and
   a third standard format provided by the Japanese hierarchy,
   wherein said first format and said second format are not identical.

2. A switching system for a telecommunications network, comprising:
   a switching matrix;
   a transport interface for receiving signals from a plurality of I/O ports, the signals being arranged in channels of at least a first and a second format;
   a plurality of cross-connections for switching the signals between the I/O ports via the switching matrix; and
   a server operatively associated with said switching matrix and comprising format exchanging circuitry operable to receive a signal arranged in said first format and to rearrange said signal into said second format, thus producing a converted signal, and to transmit said converted signal to said switching matrix for eventual output,
   wherein said first format and said second format each have a tributary, and each said tributary comprises one of the following:
   an E-1 tributary; and
   a T-1 tributary;
   and wherein said first format and said second format are not identical.

3. A switching system for a telecommunications network, comprising:
   a switching matrix;
   a transport interface for receiving signals from a plurality of I/O ports, the signals being arranged in channels of at least a first and a second format;
   a plurality of cross-connections for switching the signals between the I/O ports via the switching matrix; and
   a server operatively associated with said switching matrix and comprising format exchanging circuitry operable to receive a signal arranged in said first format, thus producing a converted signal, and to transmit said converted signal to said switching matrix for eventual output,
   wherein said cross-connections are operable to demultiplex channels in said first format and remultiplex channels 'in said second format.

4. A switching system according to claim 3 wherein said cross-connections are operable to perform, on said demultiplexed channels, at least one of the following:
   A-law to $\mu$-law conversions; and
   $\mu$-law to A-law conversions.

5. A switching system for a telecommunications network, comprising:
   a switching matrix;
   a transport interface for receiving signals from a plurality of I/O ports, the signals being arranged in channels of at least a first and a second format;
   a plurality of cross-connections for switching the signals between the I/O ports via the switching matrix; and
   a server operatively associated with said switching matrix and comprising format exchanging circuitry operable to receive a signal arranged in said first format, thus producing a converted signal, and to transmit said converted signal to said switching matrix for eventual output,
   wherein the plurality of cross-connections is comprised in the switching matrix, the switching matrix being operable to carry signals of said first format and said second format, and
   wherein the cross-connections further comprise a converting matrix operable to demultiplex channels, carry out at least one of A-law to $\mu$-law conversions and $\mu$-law to A-law conversions on said demultiplexed channels, and to remultiplex said channels.

6. A switching system according to claim 5 and wherein said converting matrix is operable to carry out remultiplexing independently of demultiplexing.

7. A switching system for a telecommunications network, comprising:
   a switching matrix;
   a transport interface for receiving signals from a plurality of I/O ports, the signals being arranged in channels of at least a first and a second format;
   a plurality of cross-connections for switching the signals between the I/O ports via the switching matrix; and
   a server operatively associated with said switching matrix and comprising format exchanging circuitry operable to receive a signal arranged in said first format, thus producing a converted signal, and to transmit said converted signal to said switching matrix for eventual output,
   wherein said logical layer function includes at least facility data link in the DS I Extended Superframe Format.

8. A method of converting signals arranged in multiplex channels of a first format to signals arranged in multiplex channels of a second format and routing said signals, comprising the steps of:
   receiving said signals from a plurality of I/O ports;
   routing said signals over a matrix to a central converter;
   demultiplexing said channels of a first format into individual channels;

converting said individual channels into channels of said second format;

remultiplexing said channels of said second format; and routing said remultiplexed channels over said matrix to appropriate output ports.

9. A method according to claim 8 and wherein said first format and said second format each comprise one of the following:

a first standard format provided by the North American hierarchy (Asynchronous I-Hierarchy);

a second standard format provided by the ITU Digital I-hierarchy (Plesiochronous Digital Hierarchy); and a third standard format provided by the Japanese hierarchy, wherein said first format and said second format are not identical.

10. A method according to claim 8 and wherein said first format is E1 and said second format is T1.

11. A method according to claim 8 wherein said first format is T1 and said second format is E1.

12. A method according to claim 8 and wherein the step of demultiplexing said channels of a first format into individual voice channels is followed by a step of A-law to $\mu$-law conversion.

13. A method according to claim 8 and wherein the step of demultiplexing said channels of a first format into individual voice channels is followed by a step of $\mu$-law to A-law conversion.

14. A method of performing logical layer functions in switching system for a telecommunications network, comprising:

receiving signals from a plurality of I/O ports, the signals being arranged in multiplexed channels;

providing a plurality of cross-connections for switching the signals between the I/O ports via the switching matrix; and providing a server operatively associated with said switching matrix to receive a signal arranged in a multiplexed format and to perform logical layer functions on said multiplexed channel so as to generate a converted signal, and to transmit said converted signal to said switching matrix for eventual output, wherein said logical layer function includes at least facility data link in the DS1 Extended Superframe Format.

15. A method according to claim 8, wherein said individual channels are voice channels.

* * * * *